(12) United States Patent
Cooper et al.

(10) Patent No.: US 12,514,233 B2
(45) Date of Patent: Jan. 6, 2026

(54) ADAPTIVE AUTOMATED PET TOY INCLUDING CIRCULATING DRIVE BELT EXTENSION OPERABLE WITH PROXIMITY SENSOR

(71) Applicants: Christopher Cooper, East Lyme, CT (US); Francis P. Turner, Norton, MA (US)

(72) Inventors: Christopher Cooper, East Lyme, CT (US); Francis P. Turner, Norton, MA (US)

( * ) Notice: Subject to any disclaimer, the term of this patent is extended or adjusted under 35 U.S.C. 154(b) by 0 days.

(21) Appl. No.: 18/885,934

(22) Filed: Sep. 16, 2024

(65) Prior Publication Data

US 2025/0089678 A1    Mar. 20, 2025

Related U.S. Application Data

(60) Provisional application No. 63/583,459, filed on Sep. 18, 2023.

(51) Int. Cl.
*A01K 15/02* (2006.01)
*A01K 29/00* (2006.01)

(52) U.S. Cl.
CPC .......... *A01K 15/025* (2013.01); *A01K 29/005* (2013.01)

(58) Field of Classification Search
CPC ...... A01K 15/00; A01K 15/02; A01K 15/025; A01K 29/005
USPC .......................................................... 119/702
See application file for complete search history.

(56) References Cited

U.S. PATENT DOCUMENTS

| | | | |
|---|---|---|---|
| 2,246,965 A | 6/1941 | Yoder | |
| 3,085,551 A | 4/1963 | Helmer | |
| 3,382,609 A | 5/1968 | Neanhouse | |
| 3,965,866 A * | 6/1976 | Lorentz | A01K 15/027 482/69 |
| 4,539,936 A | 9/1985 | Majewski | |
| 4,645,210 A * | 2/1987 | Patsy | F41J 9/02 273/406 |
| 4,656,967 A * | 4/1987 | Duksa | A01K 1/04 119/784 |
| 4,803,953 A | 2/1989 | Graves | |
| 4,930,448 A | 6/1990 | Robinson | |
| 5,261,617 A | 11/1993 | Etherington | |
| 5,657,721 A | 8/1997 | Myfield | |
| 5,743,215 A | 4/1998 | Zeff | |
| 5,823,844 A | 10/1998 | Markowitz | |
| 5,947,790 A | 9/1999 | Gordon | |

(Continued)

*Primary Examiner* — Brady W Frazier
(74) *Attorney, Agent, or Firm* — Maine Cernota & Curran

(57) ABSTRACT

An automated cat toy comprises a belt circulated by a motor between a drive shaft and an idler pully, and an extension that is alternately flung outward from the belt and then withdrawn into the toy. The belt is formed by joining one end of a strap to an intermediate attachment point thereof, with the remainder of the strap becoming the extension. A pet proximity sensor, such as a PIR sensor, enables a controller to monitor proximity and movements of a pet. An operating mode of the toy can be varied according to the sensed pet movements, and/or instructions and/or a designated pet personality type received wirelessly from a user. Usage data, such as calories burned, can be transmitted wirelessly to the user. RFID tags worn by pets can enable the controller to optimize the operating mode and report usage data separately for each of a plurality of pets.

20 Claims, 12 Drawing Sheets

(56) References Cited

U.S. PATENT DOCUMENTS

| | | | |
|---|---|---|---|
| 6,684,819 B1 | 2/2004 | Locke | |
| D521,076 S | 5/2006 | Walker | |
| 7,373,902 B2 | 5/2008 | Levan | |
| 11,297,801 B2 * | 4/2022 | Wolfgram | A01K 15/027 |
| 12,156,508 B2 * | 12/2024 | Wolfgram | A63K 1/02 |
| 2002/0020362 A1 | 2/2002 | Noto | |
| 2005/0150468 A1 | 7/2005 | Fleischhacker | |
| 2007/0095302 A1 * | 5/2007 | Levan | A01K 15/025 |
| | | | 119/708 |
| 2015/0027029 A1 * | 1/2015 | Mager | A01M 31/06 |
| | | | 43/2 |
| 2017/0042121 A1 * | 2/2017 | Jersa, III | A01K 5/02 |
| 2017/0064926 A1 * | 3/2017 | Gutierrez | G05B 19/042 |
| 2017/0196196 A1 * | 7/2017 | Trottier | A01K 15/027 |
| 2018/0133896 A1 * | 5/2018 | Kuffner | H04W 4/30 |
| 2018/0160648 A1 * | 6/2018 | Goh | A01K 15/02 |
| 2020/0229399 A1 * | 7/2020 | Wolfgram | A01K 15/025 |
| 2022/0232803 A1 * | 7/2022 | Wolfgram | A01K 15/025 |
| 2025/0089680 A1 * | 3/2025 | Wolfgram | A63K 1/02 |

* cited by examiner

ADAPTIVE AUTOMATED PET TOY INCLUDING CIRCULATING DRIVE BELT EXTENSION OPERABLE WITH PROXIMITY SENSOR

RELATED APPLICATIONS

This application claims the benefit of U.S. Provisional Application No. 63/583,459, filed Sep. 18, 2023, which is herein incorporated by reference in its entirety for all purposes.

FIELD OF THE INVENTION

The invention relates to automated toys, and more particularly, to automated toys configured to amuse cats and other pets.

BACKGROUND OF THE INVENTION

An estimated 58 million pet cats are kept in the United States. Like humans, cats require exercise and amusement to maintain proper physical and mental health. Often these cats are left alone indoors during hours when their owners are at work or otherwise away from home. A market for automated toys for cats and other pets has developed in the United States, and globally, to facilitate exercise and amusement of pets even during hours when the pet owner is absent or too busy to play with the pet personally.

One approach is to automatically cause an artificial mouse or other "lure" to move in the vicinity of the pet, enabling the pet to satisfy its predatory instincts by stalking and attacking the lure. For example, U.S. Pat. No. 7,373,902 discloses a string attached to a belt that is stretched between two shafts housed in a housing that is open on one side. The belt is circulated by a motor, thereby repeatedly drawing the string into the housing, and then "flinging" the free end of the string out from the open side of the housing. The hunting instinct of a pet, such as a cat, is stimulated by the flinging and retraction of the string, and the pet engages in chasing pouncing behavior, which is amusing to the pet and which provides the pet with needed exercise. To enable the automated pet toy to be actuated by the pet in the absence of the owner, and to save energy when the pet is not actively playing with the toy, a motion sensor can be provided to turn the toy ON and OFF depending on the movement of the pet in the vicinity of the automated pet toy.

While known automated pet toys achieve some success in amusing and exercising pets, they tend to be mechanically complex, which increases the cost of their manufacture. Furthermore, the repetitive movement of a lure can become monotonous to the pet, causing the pet to quickly lose interest. Also, such pet toys are typically designed to provide the same amusement experience to all pets, operating under an assumption that all pets of a given type, such as all cats, are basically the same, and provide, at most, only a limited ability to adjust the operation of the toy to suit the personality of each individual pet.

What is needed, therefore, is an automated toy that is less expensive to manufacture, more durable, and more successful in amusing pets as compared to previously disclosed pet toys.

SUMMARY OF THE INVENTION

The present invention is an automated toy that is less expensive to manufacture, more durable, and more successful in amusing pets as compared to previously disclosed pet toys.

Much of the present disclosure describes the present invention in terms of how it can be used to improve the health and/or amuse a "cat." However, it will be understood that embodiments of the invention can be used to benefit and/or amuse puppies, ferrets, and many other types of pet, especially pets that are predatory in nature, and that the term "cat," as used herein, is intended to refer generically to all such animals and pets, unless otherwise stated or require by context.

The disclosed toy incudes a rail comprising a channel extending in a loop about an idler pulley at a distal end thereof and a drive shaft at a proximal end thereof, the drive shaft being driven by a motor in electrical communication with a controller. When the motor is activated, a flat drive belt is circulated about the channel in a closed loop about the drive shaft and the idler pulley, while a strap extension that extends from the drive belt is alternately flung outward from the channel toward the cat, and then pulled away from the cat and behind the channel, the extension being thereby momentarily obscured from the cat.

Power can be supplied to the controller and motor by batteries, which can be rechargeable batteries, and/or from AC power via a power supply. Embodiments are configured to lie flat on a floor or other horizontal surface, and/or to be suspended vertically, for example from a door knob. At the proximal "upper" end of the channel, some embodiments include a decorative "head" that encloses the controller, motor, and drive shaft, and in some embodiments also provides a loop or other structure that can be placed over a door knob or similar suspending structure, attached to a wall, or otherwise fixed horizontally or vertically. For purposes of decoration, the head can be shaped or otherwise configured with graphics and/or shaping to outwardly resemble the face of a cat or other pet.

As noted above, known automated pet toys tend to be mechanically complex, which increases the cost of their manufacture. For example, the toy disclosed in U.S. Pat. No. 7,373,902 requires forming a material into a belt as a first step, followed by attaching a string to an attachment point of the belt as a second step. Furthermore, the structure disclosed in U.S. Pat. No. 7,373,902 requires that a housing comprising a front side and back side that form an interior chamber be provided in a length that is at least as long as the belt, with the entire length of the belt and the associated pullies being enclosed within the housing.

In contrast, the cost of manufacture of the present invention is reduced, and the durability and reliability of the toy are improved, by forming the extension and the drive belt from a single strap in a single step. Specifically, the drive belt and extension of the present invention are formed by attaching a distal end of a flexible strap to the inner surface of the strap at an intermediate "attachment" location that is offset from a proximal end of the strap. The drive belt is thereby formed by the portion of the strap that extends from its distal end to the attachment location, while the extension is formed by the remainder of the strap, which extends from the attachment location to the proximal end of the strap.

Furthermore, embodiments of the present invention provide a central channel that supports the drive shaft and pulley, and is encircled by the drive belt, thereby obviating any need to surround the entire belt with a cover and further reducing the cost of manufacture.

In embodiments, the durability of the invention is enhanced by manufacturing the flexible strap from a polymer, rather than from a braided or woven material, thereby reducing any likelihood that a claw of the cat will become lodged in the extension, which could otherwise result in derailment of the belt, dislodging of the toy from its attachment location, and/or other damage to the toy, or even injury to the cat.

In various embodiments, the relatively low elasticity and moderate flexibility of the strap, which is necessary to meet the functional requirements of the belt portion of the strap, also ensures that substantially the entire length of the extension will be flung outward from the belt toward the cat, with only limited bending or coiling of the extension that might otherwise reduce the distance from the belt that is reached by the proximal end of the extension. In some embodiments, this low elasticity and moderate flexibility enables the extension to be shorter than the distance between the drive shaft and the idler pulley, thereby ensuring that the entire extension will be hidden from the cat for a perceptible duration after it is drawn into the channel behind the drive belt, during which the cat will anticipate and prepare for a fresh attack once the extension reappears.

Embodiments improve the efficacy of the invention in amusing cats and other pets by implementing a pet sensor array and/or a plurality of speeds and/or other control modalities of the controller. The pet sensor array can be any sensor or group of sensors that will detect the presence and/or activities of the cat, including direct interactions between the cat and the extension. These can comprise, for example, a proximity sensor, a belt tension sensor, and/or a vibration sensor. The proximity sensor can be a passive infrared sensor (PIR) or a microwave sensor, and can be used by the controller to sense the proximity and/or the movements of the cat. The belt tension sensor can be cooperative with the drive shaft or idler pulley, and can be configured to detect when the cat is interacting with the extension, and thereby increasing the tension on the belt. The vibration sensor can be, for example, an accelerometer.

In various embodiments, when the initial arrival of a cat is sensed by the proximity sensor, the controller activates the motor, causing the extension to be repeatedly flung outward and then withdrawn. And when the controller determines, based on data from the pet sensor array, that the cat is no longer present, or is no longer interacting with the toy, the controller automatically deactivates the motor, thereby saving power and extending the life of the toy.

Embodiments further enhance the pet entertainment efficacy of the invention by varying the speed at which the motor operates. Embodiments include a plurality of "modes" in which the motor is operated, for example at various rotation speeds, and or with different patterns of stopping and starting and/or speed variations (intermittency), or any combination thereof. These can be presented to a user as being optimal for pets having different "personalities," such as aggressive, shy, expert, dominant, impulsive, wary, curious, etc.

Various embodiments include a belt synchronizing sensor, that can be used by the controller to synchronize the speed variations of the belt rotation during each "cycle" of the belt, for example to cause the extension to be rapidly and energetically flung toward that cat, and then drawn slowly back, possibly at a variable speed, thereby further exciting the instincts of the cat.

Various embodiments include Bluetooth, infrared, or other remote or wireless connectivity, and are thereby able to receive instructions from a user, and/or to report activity to a user. For example, in embodiments a user is able to use an application running on a cellular telephone to turn the motor on and off, and/or control the speed, duration, randomization, intermittency, and other operational settings of the toy. Embodiments enable a user to reverse the direction of the motor, for example to add further interest for the cat, or to recover if a jam or snag of the extension occurs.

In similar embodiments, the controller is able to transmit data to a user regarding the frequency, mode, and/or duration of usage of the toy by the cat, which can be presented in terms of an aggregate duration of usage and/or an estimated quantity of calories burned by the cat in using the toy during a specified time period.

Embodiments of the invention are configured to automatically change and/or adjust their modality in response to interactions with the cat. In addition to simply "shutting off" when the cat is no longer present, embodiments sense when the cat has recently stopped interacting with the extension, or reduced its level of activity, and automatically vary the speed, intermittency, and/or other operational parameters in an attempt to re-capture the interest of the cat, who may have become bored with simple, repetitive movement of the extension.

Various embodiments attempt to determine a personality type of a cat according to data sensed by the pet sensor array, by comparing patterns of activity of the cat with preset ranges that apply to various cat personality types. The controller can then implement one or more pre-established patterns of operation that have been designated as being especially effective for the determined personality type of the cat.

Embodiments of the present invention further provide identification tags, such as radio frequency identification (RFID) tags, that can be worn by a cat, and a corresponding sensor or reader included with the toy. This allows the operation of the toy to be adapted to the individual needs and preferences of each of several cats to whom the toy may be available, and/or allows usage data to be recorded and reported separately for each of the cats.

For example, in embodiments a user is able to specify different operational speeds or other operational characteristics for each cat, possibly by specifying a different personality type for each cat, thereby enabling the controller, upon detecting an RFID tag or other identifying marker worn by a specific one of a plurality of known cats, to initiate operation of the motor according to the speed and/or other operational parameters that have been specified for that specific cat.

Similarly, by identifying which cat is playing with the toy during each play session, in embodiments the controller is able to record and report to a user the number of calories burned and/or other details about usage of the toy by each of the cats.

One general aspect of the present invention is a pet toy configured to amuse and/or otherwise benefit a pet. The pet toy includes an elongated channel having a proximal end and a distal end, an idler pulley proximate the distal end of the channel, a drive shaft proximate the proximal end of the channel, a motor coupled to and configured to rotate the drive shaft, a drive belt extending along the channel between and encircling the drive shaft and the idler pulley, the drive belt being configured to circulate about the drive shaft and the idler pulley when the motor causes the drive shaft to rotate, a controller configured to activate and deactivate the motor, a pet sensor array in data communication with the controller, the pet sensor array comprising a pet proximity sensor, the pet proximity sensor being configured to detect at least one of a presence and a movement of a pet that is proximate the pet toy, and a drive belt extension.

The drive belt and drive belt extension are formed by joining a distal end of a strap to an attachment location on the strap that is intermediate between the distal end of the strap and a proximal end of the strap, the drive belt being thereby formed by a first portion of the strap extending from its distal end to the attachment location, and the drive belt extension being a second portion of the strap extending from the attachment location to the proximal end of the strap, circulation of the drive belt thereby causing the drive belt extension to be alternately flung out through an open front side of the channel and withdrawn behind a rear side of the channel.

Embodiments further comprise a cover at least partly surrounding the controller and motor.

In any of the above embodiments, the proximity sensor can be a passive infrared (PIR) sensor or a microwave sensor.

In any of the above embodiments, the pet sensor array can further comprise a vibration sensor;

In any of the above embodiments, the pet sensor array can further comprise a tension sensor configured to sense variations in the tension of the drive belt;

In any of the above embodiments, the pet toy can further comprise a belt synchronizing sensor configured to detect a feature of the drive belt as it passes thereby.

In any of the above embodiments, the strap from which the drive belt and drive belt extension are formed can be a polymer ribbon strap.

In any of the above embodiments, a central portion of the channel can be encircled by the drive belt.

In any of the above embodiments, the channel can be a recessed channel that is bounded by channel sides extending forward and backward beyond the drive belt as it circulates within the channel about the drive shaft and the idler pulley. In some of these embodiments the open front side of the channel is formed between the channel sides and is less than 1.5 cm wide, a paw of the pet being thereby prevented from entering into the recessed channel and accessing the drive belt.

A second general aspect of the present invention is a pet toy configured to amuse and/or otherwise benefit a pet. The pet toy includes an elongated channel having a proximal end and a distal end, an idler pulley proximate the distal end of the channel, a drive shaft proximate the proximal end of the channel, a motor coupled to and configured to rotate the drive shaft, a drive belt extending along the channel between and encircling the drive shaft and the idler pulley, the drive belt being configured to circulate about the drive shaft and the idler pulley when the motor causes the drive shaft to rotate, a controller configured to activate and deactivate the motor, a pet sensor array in data communication with the controller, the pet sensor array comprising a pet proximity sensor, the pet proximity sensor being configured to detect at least one of a presence and a movement of a pet that is proximate the pet toy, and an elongated extension extending outward from the drive belt.

The circulation of the drive belt thereby causes the drive belt extension to be alternately flung out through an open front side of the channel and withdrawn behind a rear side of the channel. The controller is configured to vary an operational mode of the toy in response to data received by the controller from the pet sensor array, varying said operational mode comprising varying at least one of a non-zero rotational speed of the motor and varying a rotation intermittency of the motor.

In embodiments, the controller is configured to change the operational mode upon detecting that interaction between the pet and the toy has decreased.

In any of the above embodiments, the controller can be configured to select the operational mode according to at least one of an age and a weight of the pet as specified by a user.

In any of the above embodiments, the controller can be configured to select the operational mode according to a personality type of the pet as specified by a user.

In any of the above embodiments, the controller can be configured to select the operational mode according to a personality type of the pet, said personality type being estimated by the controller according to a pattern of usage of the toy by the pet as determined from data received by the controller from the pet sensor array.

Any of the above embodiments can further include an identity tag sensor configured to sense a proximity of an identifying tag cooperative with a pet, the controller being configured to select the operational mode according to the sensed identity of the pet.

Any of the above embodiments can further include a wireless connectivity module that enables communication between the controller and a remote user device. In some of these embodiments, the controller is configured to vary the operational mode according to instructions received from the remote user device. In any of these embodiments, the controller can be configured to transmit usage data to the remote user device, said usage data being data regarding at least one of times and durations of interaction between the pet and the toy. And in some of these embodiments, the usage data includes an estimated quantity of calories consumed by the cat during usage of the toy.

And in any of the above embodiments, the channel can be a recessed channel that is bounded by channel sides extending forward and backward beyond the drive belt as it circulates within the channel about the drive shaft and the idler pulley. In some of these embodiments, the open front side of the channel is formed between the channel sides and is less than 1.5 cm wide, a paw of the pet being thereby prevented from entering into the recessed channel and accessing the drive belt.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
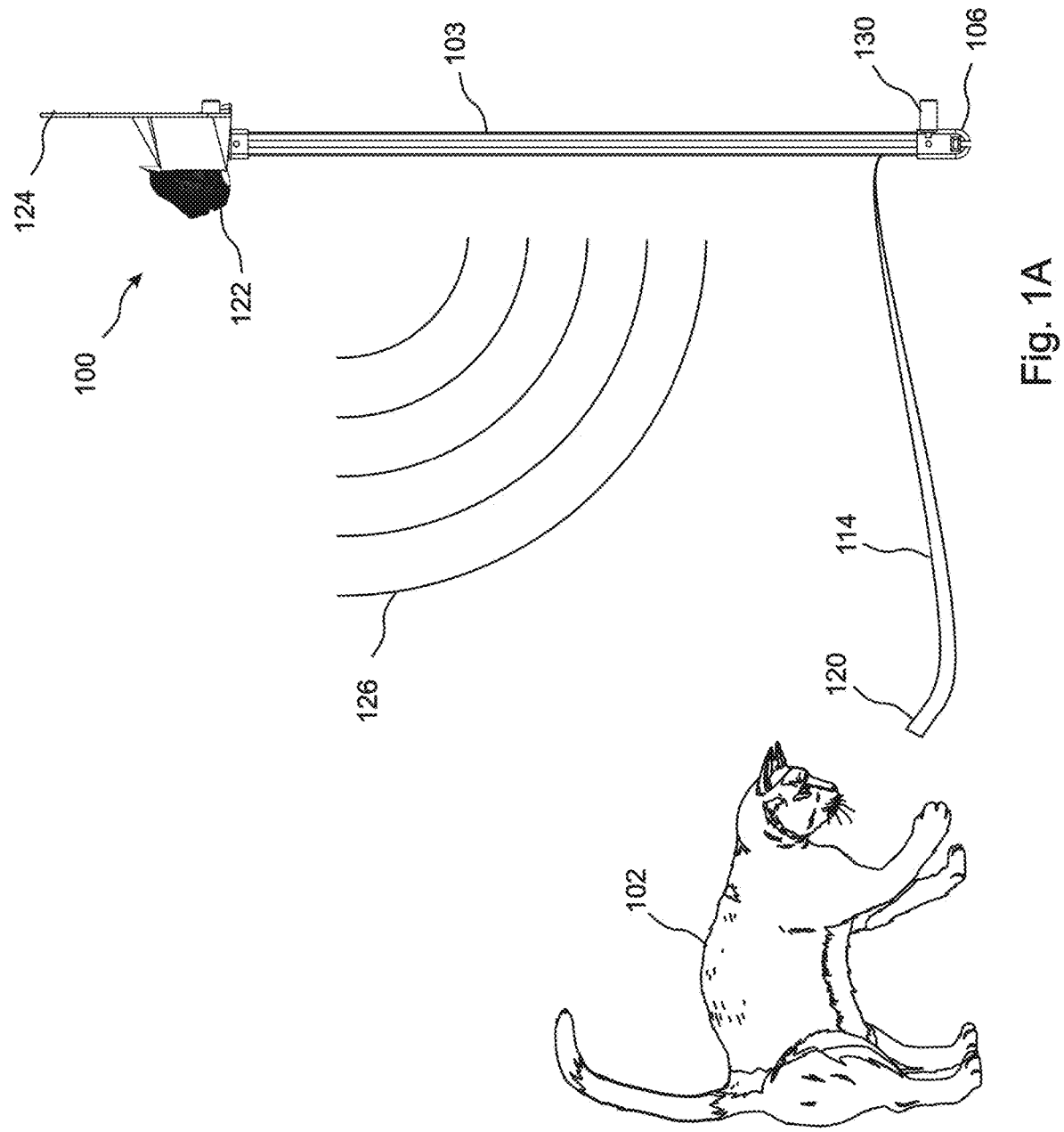
FIG. 1A is a side view of an embodiment, drawn to scale, shown in a vertical orientation in relationship to a cat.
Figure 1B:
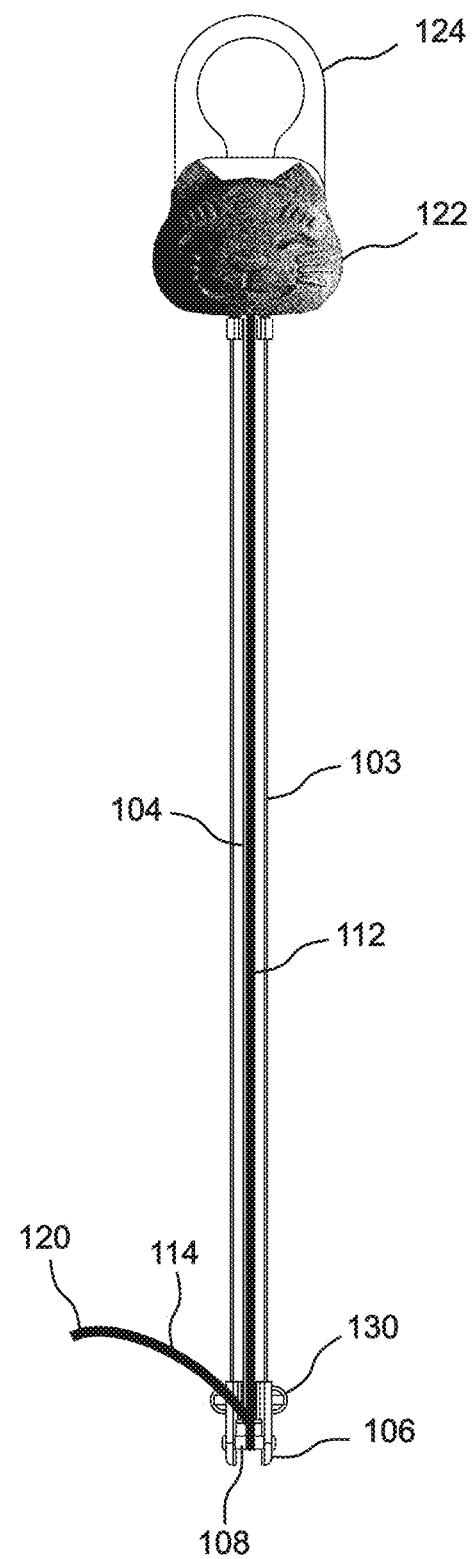
FIG. 1B is a front view, drawn to scale, of the embodiment of FIG. 1A.
Figure 1C:
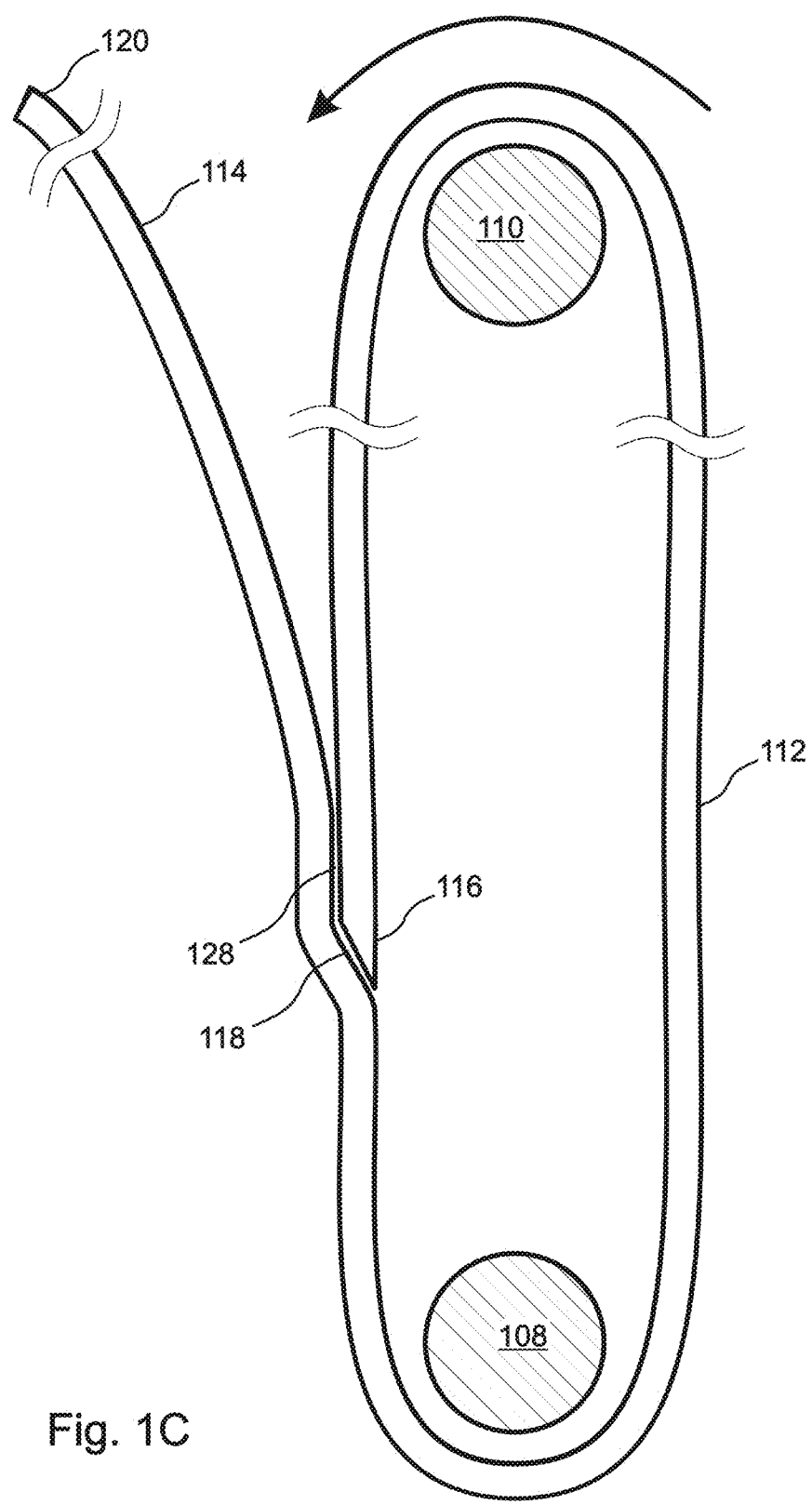
FIG. 1C is a side view of the belt, extension, idler pulley, and drive shaft in an embodiment where the distal end of the belt is diagonally cut.
Figure 1D:
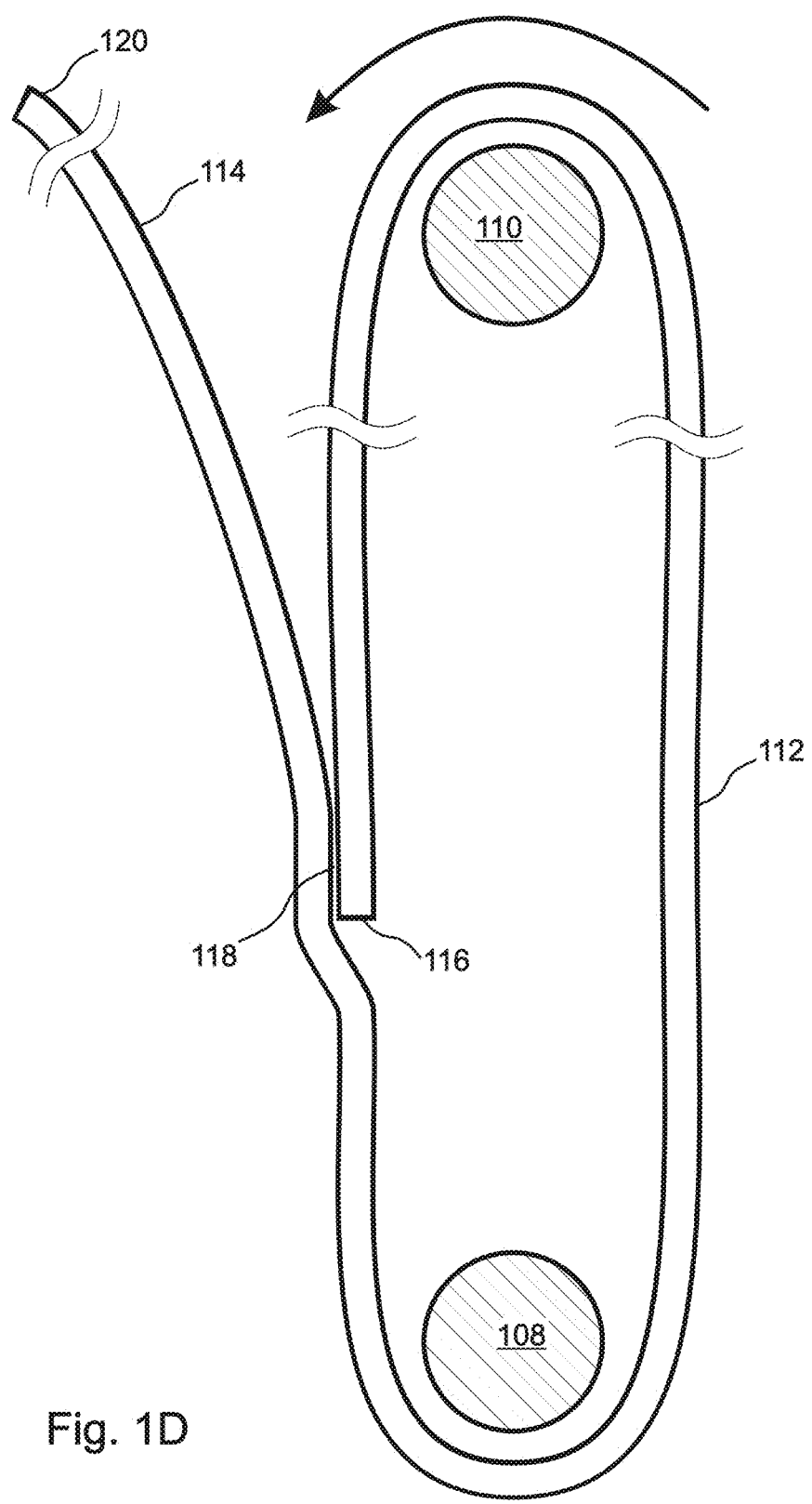
FIG. 1D is a side view of the belt, extension, idler pulley, and drive shaft in an embodiment where the distal end of the belt is square cut

With reference to FIGS. 1A through 1C, the present invention is an automated toy 100 that is less expensive to manufacture, more durable, and more successful in amusing pets 102 as compared to previously disclosed pet toys. FIG. 1A is a side view of an embodiment 100 shown interacting with a cat 102, FIG. 1B is a front view, and FIGS. 1C and 1D are side views showing only the internal mechanical elements of the toy 100.

Much of the present disclosure describes the present invention in terms of how it can be used to amuse and/or improve the health of a "cat." However, it will be understood that embodiments of the invention can be used to amuse and/or benefit puppies, ferrets, and many other types of pet, especially pets that are predatory in nature, and that the term "cat," as used herein, is intended to refer generically to all such animals and pets, unless otherwise stated or require by context.

The disclosed toy 100 incudes a rail 103 comprising a central channel 104 extending in a loop between an idler pulley 108 at a distal end 106 thereof and a motor-driven drive shaft 110 at a proximal end thereof. A flat drive belt 112 is circulated about the channel 104 in a closed loop about the drive shaft 110 and the idler pulley 108, while a strap extension 114 (also referred to herein simply as the "extension") that extends from the drive belt 112 is alternately flung outward from the channel 104 toward the cat 102, and then pulled away from the cat 102 and behind and within the channel 104, the strap extension 114 being thereby momentarily obscured from the cat 102. In the illustrated embodiment, the channel 104 is a recessed channel 104, in that sides 236 of the channel 104 extend beyond the idler pulley 108 and the drive pulley 110, and forward and backward on either side of the drive belt 112, thereby maintaining the drive belt 112 within a recess in alignment with the rail 103.

In the illustrated embodiment, the opening between the sides 236 of the channel 104 is sufficiently narrow to prevent the paw of a pet 102 from entering into the recessed channel 104 and accessing the drive belt 112, thereby preventing the pet 102 from stopping the motion of the drive belt 112 by intentionally or accidentally placing its paw on the surface of the channel 104. For example, if the pet 102 is a cat, then the channel can be less than 1.5 cm in width.

Rather than forming the drive belt 112 from a strap in a first step, and then attaching a separate string or other extended component to an outward-facing surface of the drive belt 112 in a second step, the cost of manufacture of the present invention is reduced, and the durability and reliability of the toy are improved, by forming the strap extension 114 and the drive belt 112 from a single strap in a single step.

Specifically, the drive belt 112 and strap extension 114 of the present invention are formed by bonding a distal end 116 of a flexible strap to the inner surface of the strap at an intermediate "attachment" location 118 that is offset from a proximal end 120 of the strap extension 114. In the illustrated embodiment, the bonding extends for a short distance 128 beyond the attachment location 118. The drive belt 112 is thereby formed by the portion of the strap that extends from its distal end 116 to the attachment location 118, while the strap extension is formed by the remainder of the strap, which extends from the attachment location 118 to the proximal end 120 of the strap extension 114. FIG. 1C illustrates an embodiment where the distal end 116 of the strap is diagonally cut and directly adhered to the attachment location 118, while FIG. 1D illustrates an embodiment where the distal end 116 of the strap is square cut, and a side region of the strap proximate the distal end is adhered to the attachment location 118

In embodiments, the durability of the invention 100 is enhanced by manufacturing the flexible drive belt 112 and strap extension 114 from a polymer, rather than from a braided or woven material, thereby reducing any likelihood that a claw of the cat 102 will become lodged in the strap extension 114, which could otherwise result in derailment of the drive belt 112, dislodging of the toy 100 from its attachment location, and/or other damage to the toy 100, or even injury to the cat 102. In some of these embodiments, the belt is made approximately of a thickness of 300 um (12 mil) of thermoplastic urethane (TPU). In various embodiments the drive belt 112 ranges in thickness from 150 um (6 mil) up to 750 um (30 mil). In embodiments, The TPU belt has a Shore A value of between 75A and 95A. In other embodiments, the drive belt 112 is made from polyethylene (PE), poly-vinyl chloride (PVC), thermoplastic polyolefin (TPO), a thermoplastic elastomer (TPE), or any other thermoplastic or thermoset material.

In embodiments, the drive 112, and hence the strap extension 114, is fluorescent, thereby further capturing the attention of a cat or other pet.

In various embodiments, the relatively low elasticity and moderate flexibility of the drive belt 112 and strap extension 114, which is necessary to meet the functional requirements of the drive belt 112 portion of the drive belt 112, 114, also ensures that substantially the entire length of the strap extension 114 will be flung outward from the drive belt 112 toward the cat 102, with only limited bending or coiling of the strap extension 114 that might otherwise reduce the distance from the drive belt 112 that is reached by the proximal end 120 of the strap extension 114. In some embodiments, this low elasticity and moderate flexibility enables the strap extension 114 to be shorter than the distance between the drive shaft 110 and the idler pulley 108, thereby ensuring that the entire strap extension 114 will be hidden from the cat 102 for a perceptible duration after it is drawn into the channel 104 behind the drive belt 112, during which the cat 102 will anticipate and prepare for a fresh attack once the strap extension 114 reappears.

In the illustrated embodiment, a rear plate 126 located behind the cover 122 includes a loop 124 that can be placed over a door knob or similar suspending structure. Other embodiments provide a bracket that can be attached to a wall, or some other vertical attachment mechanism as is known in the art.

Figure 2A:
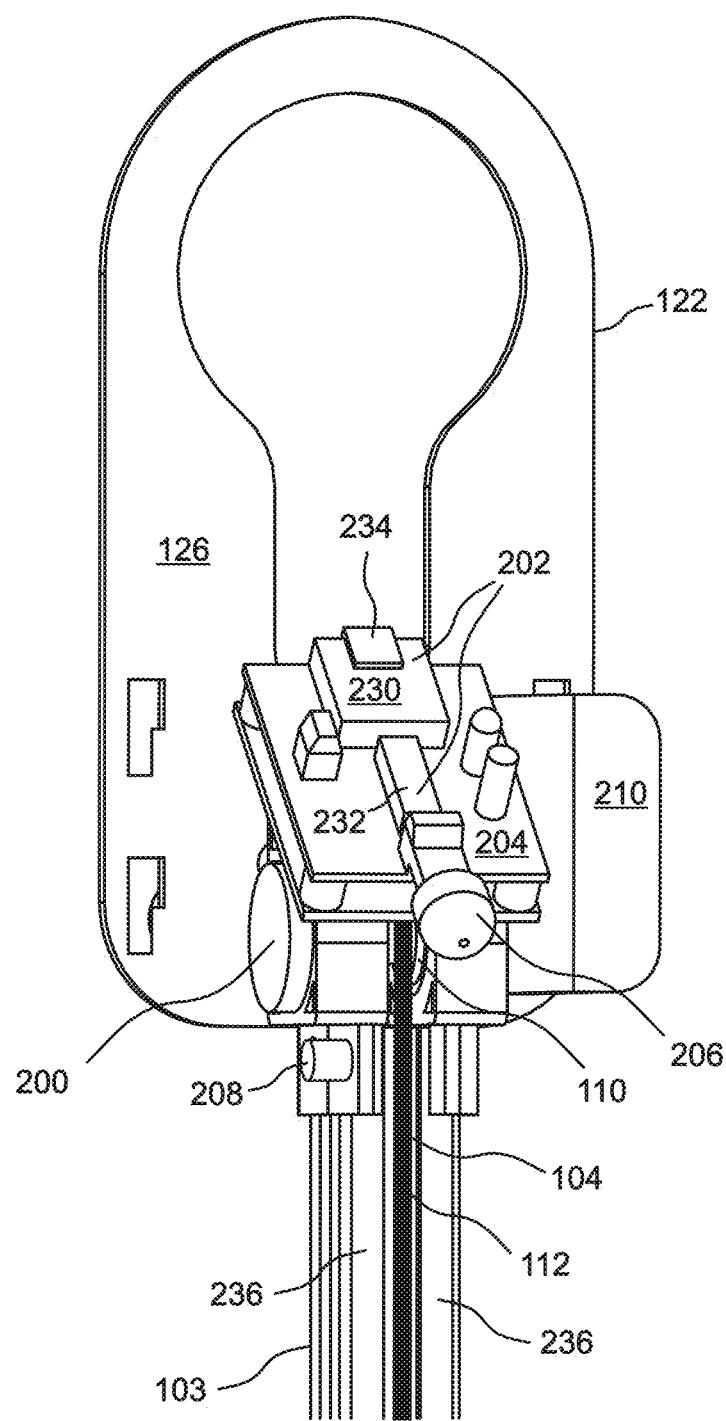
FIG. 2A is a close-up perspective of the proximal end of an embodiment.
Figure 2B:
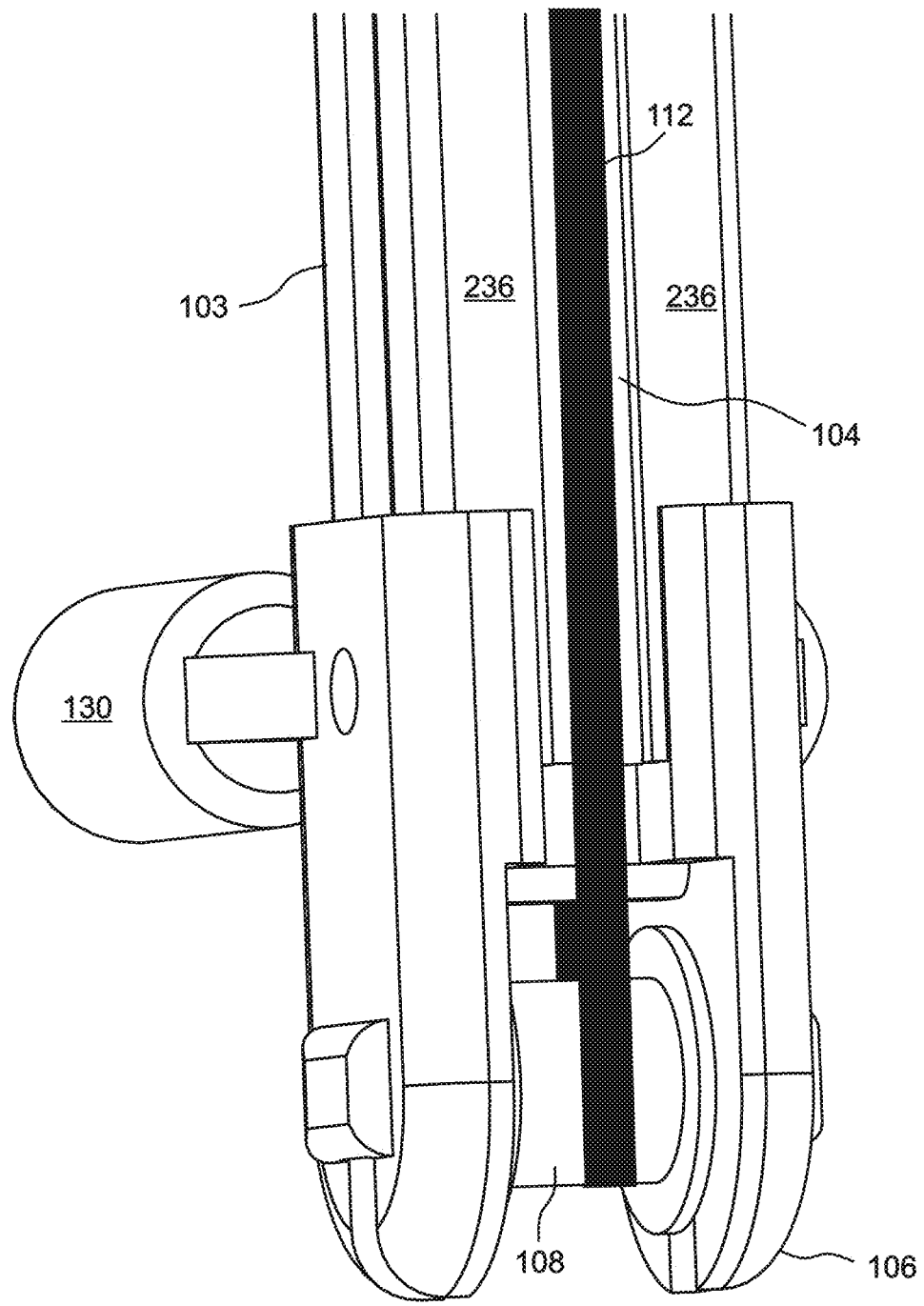
FIG. 2B is a close-up perspective view of the distal end of the embodiment of FIG. 2A.

With reference to FIG. 2A, the drive shaft 110 is driven by a motor 200, which is in electrical communication with a controller 202, which in the illustrated embodiment includes a microcontroller 230 and a motor controller 232, both of which are mounted on a printed circuit board 204 with a rechargeable battery 210 as a power source. The illustrated embodiment further includes a power supply input 234, which can be used to recharge the battery 210 or to operate the toy without a battery. In similar embodiments, the power is supplied by non-rechargeable batteries. In the illustrated embodiment, the printed circuit board 204 is tilted away from horizontal, which helps to guide the strap extension 114 as it circulates upward in preparation for being flung outward toward the cat 102.

In embodiments, a cover 122 and rear plate 126 is provided at the proximal end of the rail 103 that enclose the controller 202, motor 200, and drive shaft 110. With reference again to FIG. 1B, in the illustrated embodiment, for purposes of decoration, the cover 122 is shaped or otherwise configured with graphics and/or shaping to outwardly resemble the face of a cat, thereby amusing the owner of the cat, as well as the cat itself.

Referring again to FIG. 2A, embodiments improve the efficacy of the invention in amusing cats 102 and other pets by implementing a pet sensor array 206 configured to provide data to the controller that allows the controller to adapt operating modes of the toy according to sensed interaction of the pet with the toy. The pet sensor array 206 can be any sensor or combination of sensors that will detect the presence and/or activities of the cat 102, including direct interactions between the cat 102 and the strap extension 114. In particular, the pet sensor array 206 can include any combination of a proximity sensor 206, a belt tension sensor (not shown), and/or a vibration sensor (not shown), among other sensors known in the art. The proximity sensor 206 can be a passive infrared sensor (PIR) or a microwave sensor, and can be configured, in combination with the controller 202, to sense both the presence and/or the movements of the cat 102. The belt tension sensor can be cooperative with the drive shaft 110 or idler pulley 108, and can be configured to detect when the cat 102 is interacting with the strap xtension 114, and thereby increasing the tension on the drive belt 112. The vibration sensor can be, for example, an accelerometer. Note that, unless otherwise stated or required by context, the term "pet sensor array" as used herein refers to any such sensor or combination of sensors configured to detect the presence and/or movements of the cat 102.

Various embodiments include a belt synchronizing sensor 208, that can be used by the controller to synchronize operation of the drive belt 112 with the position of the strap extension 114 in each cycle. For example, the belt position sensor 208 can be used by the controller 202 to vary the speed of the belt's rotation during each "cycle" of the drive belt 112, for example to cause the strap extension 114 to be rapidly and energetically flung toward that cat 100, and then drawn back more slowly, possibly at a variable speed, thereby further exciting the instincts of the cat 100. In the illustrated embodiment, the belt position sensor 208 is configured to register the passage of the strap extension 114 past the sensor 208.

Figure 3:
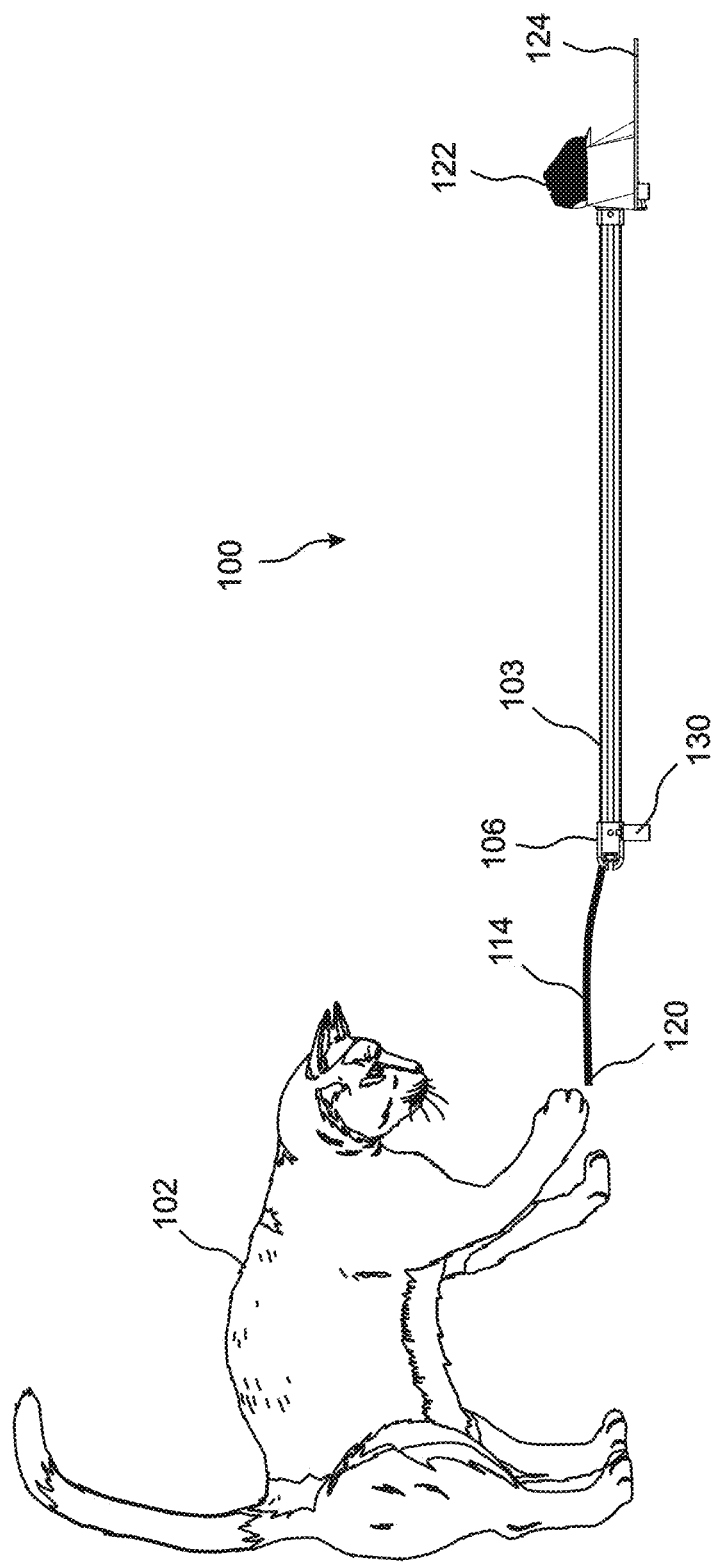
FIG. 3 is a is a side view of the embodiment of FIG. 1A, drawn to scale, shown in a horizontal orientation in relationship to the cat.

With reference to FIG. 3, embodiments are configured such that they can be used while lying flat on a floor or other horizontal surface, as well as when they are mounted vertically. The illustrated embodiment includes short legs 130 at its distal end 106 that enable horizontal operation, as well as providing a "stand-off" spacing away from a wall or door if the toy 100 is operated vertically.

It should be understood that, while FIGS. 1A through 3 illustrate the channel 104 as being configured so that the end 120 of the strap extension 114 is flung outward in front of the apparatus 100, in other embodiments the channel 104 is configured such that the end 120 of the strap extension 114 is flung to one side, or to both sides, of the apparatus 100. Some embodiments in which the end 120 of the strap extension 114 is flung to both sides are able to entertain two pets concurrently, one pet being on either side of the apparatus 100.

Figure 4:
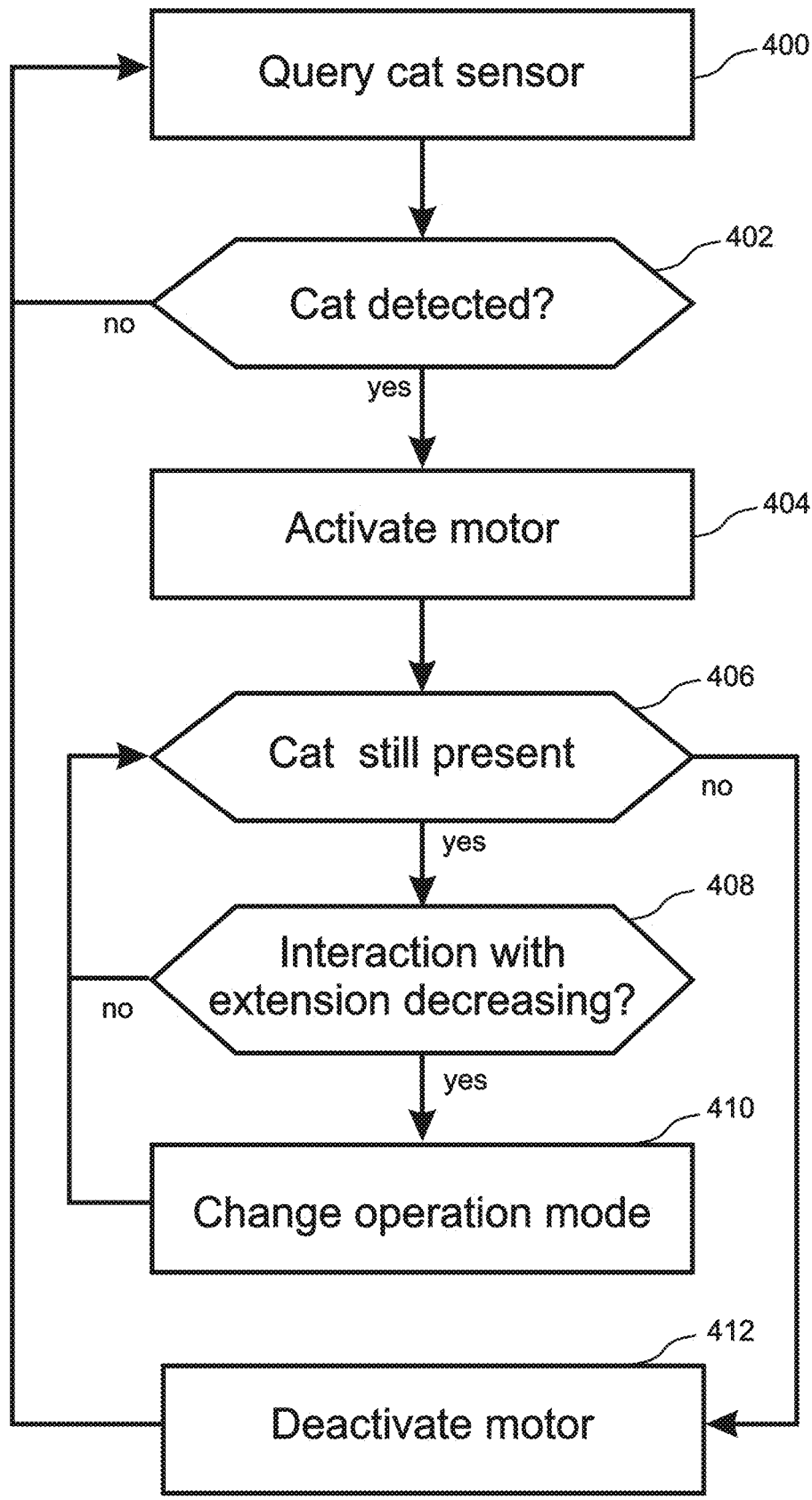
FIG. 4 is a flow diagram illustrating adaptive control of the motor by the controller in response to changes in interaction between a pet and the disclosed toy, according to an embodiment of the present invention.

With reference to FIG. 4, in some embodiments, the controller 202 queries 400 the pet sensor array 206 until the arrival 402 of a cat 102 is sensed 126, for example by a proximity sensor 206 that is included in the pet sensor array, the controller 202 activates 404 the motor 200, causing the strap extension 114 to be repeatedly flung outward and then withdrawn. And when the pet sensor array 206 determines 406 that the cat 102 is no longer present, or is no longer interacting with the strap extension 114, the controller 202 automatically deactivates 412 the motor 200, thereby saving power and extending the life of the batteries (if used) and of the toy 100.

Embodiments enhance the pet entertainment efficacy of the invention by varying the speed at which the motor 200 operates from one cycle to the next. Some embodiments include a plurality of "modes" in which the motor is controlled, for example at various rotation speeds, and or with different patterns of stopping and starting and/or speed variations (intermittency), or any combination thereof. These can be presented to a user as being optimal for pets having different "personalities," such as aggressive, shy, expert, dominant, impulsive, wary, curious, etc.

With continuing reference to FIG. 4, in addition to simply "shutting off" 412 when the cat 102 is no longer present, embodiments sense when the cat has recently reduced interaction 408 with the strap extension 114, and automatically vary the speed, intermittency, and/or other operational parameters 410, in an attempt to re-capture the interest of the cat 102, who may have become bored with simple, repetitive movement of the extension.

Figure 5:
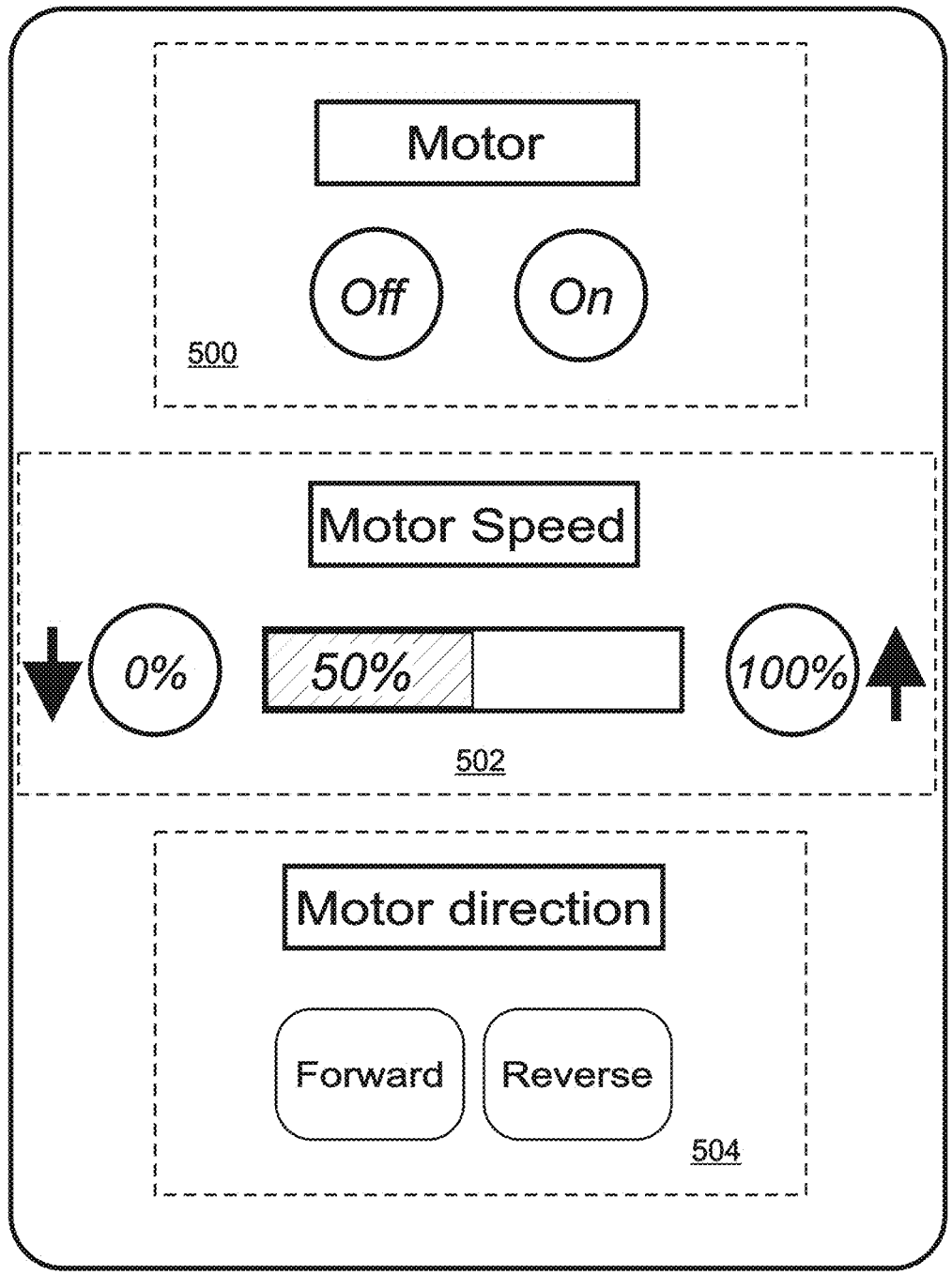
FIG. 5 illustrates display on a remote user device, in an embodiment, of a graphical user interface enabling the user to control the speed and direction of the motor.

Various embodiments include Bluetooth, infrared, or other remote or wireless connectivity, and are thereby able to receive instructions from a user, and/or to report activity to a user. For example, with reference to FIG. 5, in embodiments a user is able to use an application running on a cellular telephone to turn the motor on and off 500, and/or control the speed 502, duration, randomization, intermittency, and other operational settings of the toy 100. Embodiments enable a user to temporarily reverse the direction 504 of the motor 200, for example if a jam or snag of the strap extension 114 occurs.

Figure 6:
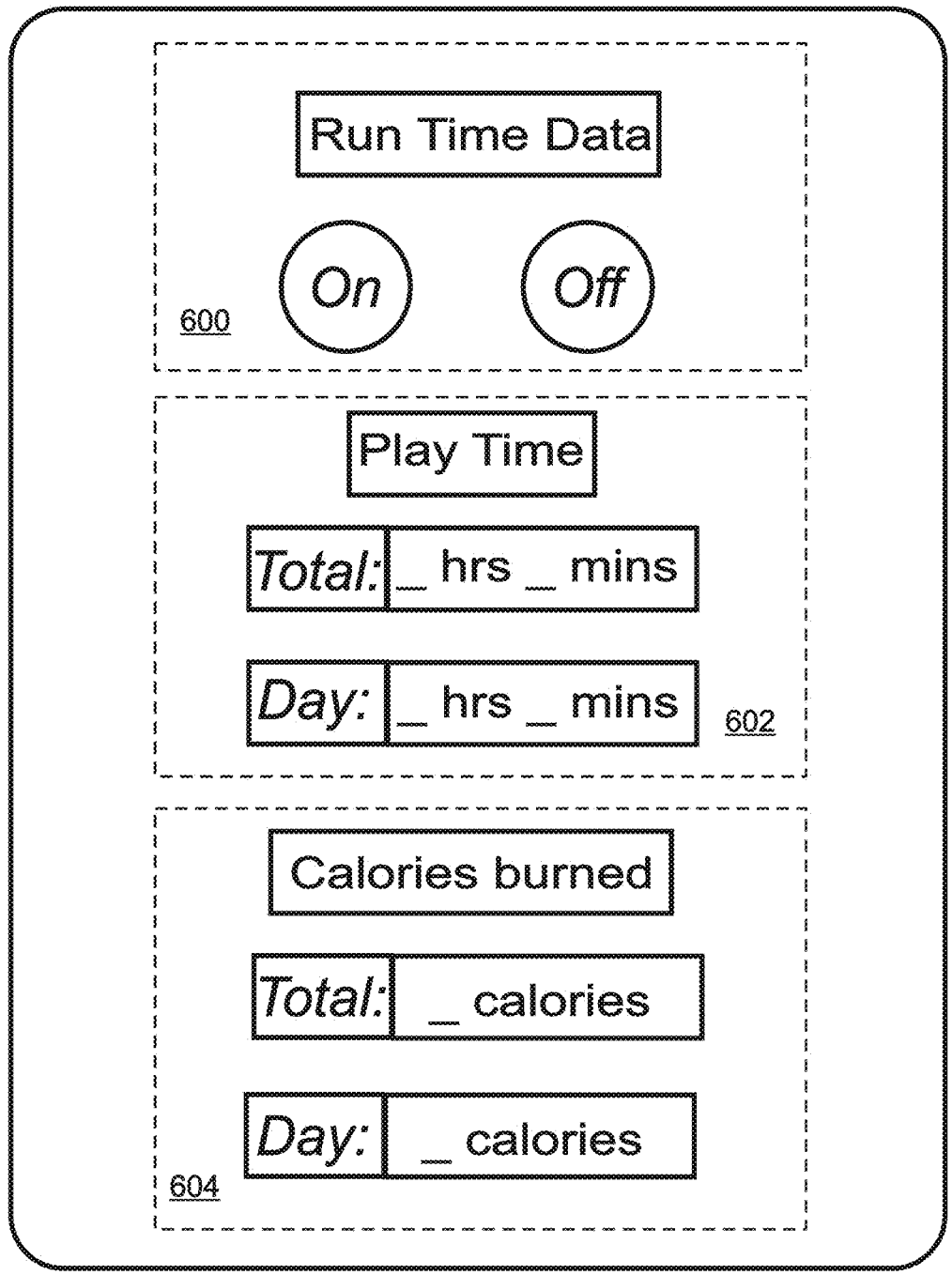
FIG. 6 illustrates display on a remote user device, in an embodiment, of a graphical user interface enabling the user to receive usage data of the toy from the controller.

With reference to FIG. 6, in similar embodiments the controller 202 is able to transmit data to a user regarding frequency, mode, and/or duration of usage of the toy 100 by the cat 102 during a time period specified 600 by the user, which can be presented in terms of a duration of usage 602 and/or an estimated quantity of calories burned 604 by the cat 102 in using the toy 100.

Figure 7:
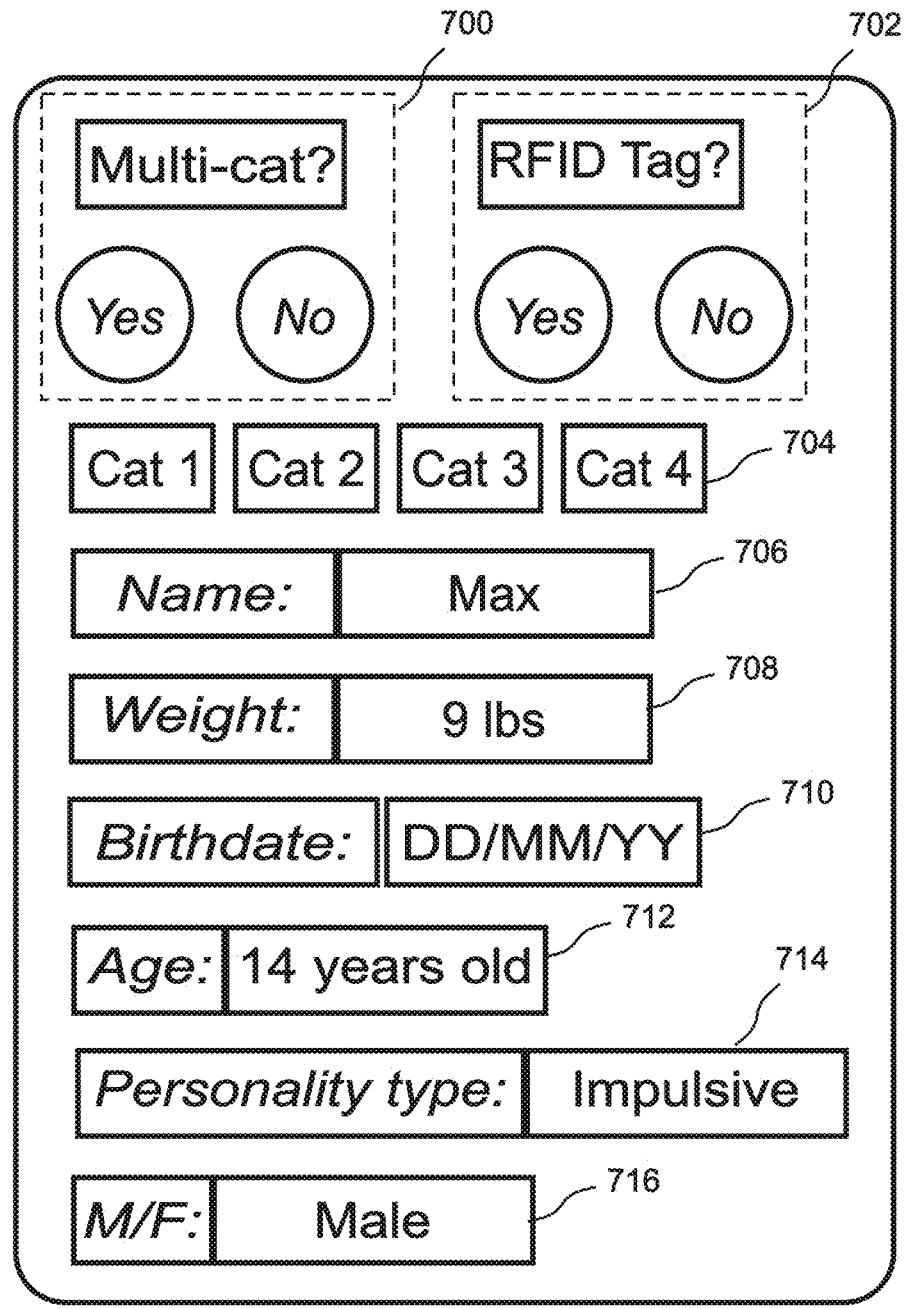
FIG. 7 illustrates display on a remote user device, in an embodiment, of a graphical user interface enabling the user to provide to the controller data regarding characteristics of a plurality of pets likely to play with the toy, where the pets can be distinguished from each other by the controller according to RFID tags worn by the pets.

With reference to FIG. 7, in case more than one cat 102 is expected to interact with the toy 700, embodiments of the present invention further provide identification tags such as radio frequency identification (RFID) tags 702 that can be worn by a cat 102, and a corresponding sensor or reader (not shown) included with the toy 100. This allows the operation of the toy 100 to be adapted to the individual needs and preferences of each of several cats 704 to whom the toy may be available.

For example, in embodiments a user is able to specify different operational speeds or other operational characteristics for each cat 704, possibly by specifying a name 706, weight 708, birthdate 710 and/or age 712, gender 716, and/or personality type 714 for each cat 704, thereby enabling the controller 202, upon detecting an RFID tag or other identifying marker worn by a specific one of a plurality of known cats 704, to initiate operation of the motor 200 according to the speed and/or other operational parameters that have been specified for that specific cat 704.

Similarly, by identifying which cat is playing with the toy during each play session, in embodiments the controller is able to record and report to a user the number of calories burned and/or other details about usage of the toy by each of the cats.

Figure 8:
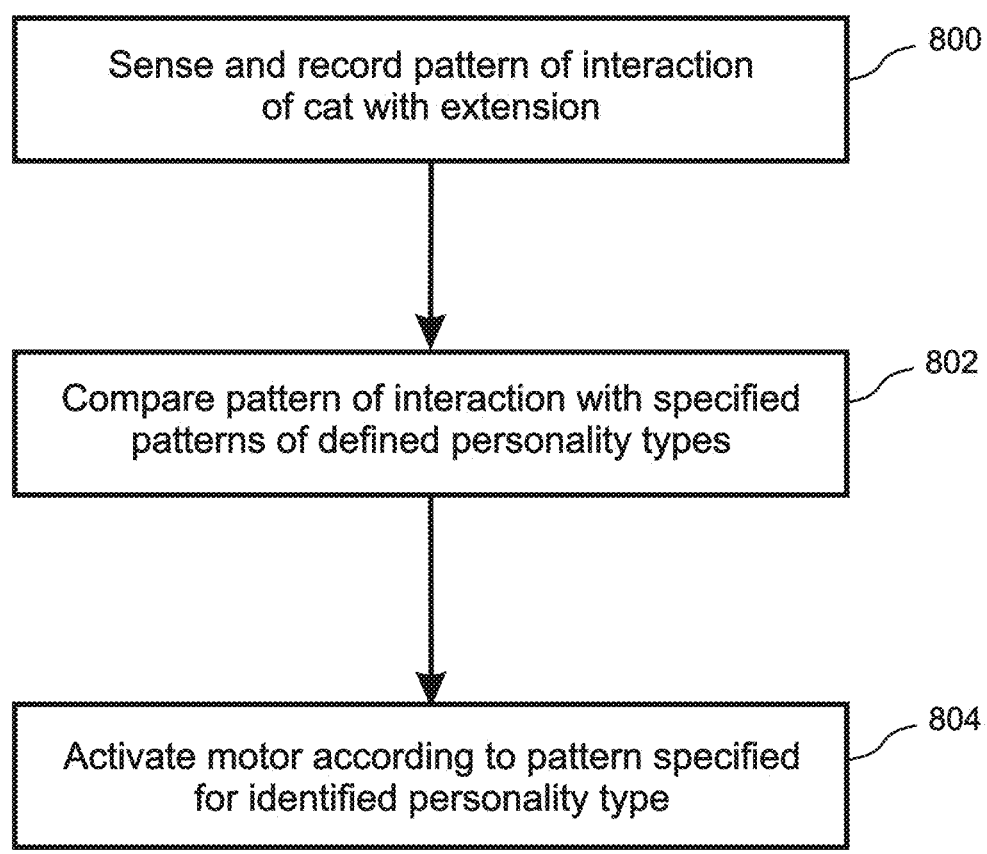
FIG. 8 is a flow diagram illustrating estimation by the controller, in an embodiment, of the personality type of a pet based on a sensed pattern of interaction of the pet with the toy.

With reference to FIG. 8, various embodiments attempt to determine a personality type of a cat 102 according to data sensed by the one or more pet sensor arrays 206, by comparing patterns of activity 800 of the cat 102 with predefined ranges 802 that apply to various cat personality types. The controller 202 can then implement one or more pre-established patterns of operation 804 that have been designated as being especially effective for the determined personality type of the cat 102.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A pet toy configured to amuse and/or otherwise benefit a pet, the pet toy comprising:
   a rail comprising an elongated channel having a proximal end and a distal end;
   an idler pulley proximate the distal end of the channel;
   a drive shaft proximate the proximal end of the channel;
   a motor coupled to and configured to rotate the drive shaft;
   a drive belt extending along the channel between and encircling the drive shaft and the idler pulley, the drive belt being configured to circulate about the drive shaft and the idler pulley when the motor causes the drive shaft to rotate;
   a controller configured to activate and deactivate the motor;
   a pet sensor array in data communication with the controller, the pet sensor array comprising a pet proximity sensor, the pet proximity sensor being configured to detect at least one of a presence and a movement of a pet that is proximate the pet toy; and
   a drive belt extension;
   wherein the drive belt and drive belt extension are formed by joining a distal end of a strap to an attachment location on the strap that is intermediate between the distal end of the strap and a proximal end of the strap, the drive belt being thereby formed by a first portion of the strap extending from its distal end to the attachment location, and the drive belt extension being a second portion of the strap extending from the attachment location to the proximal end of the strap;
   circulation of the drive belt thereby causing the drive belt extension to be alternately flung out through an open front side of the channel and withdrawn behind a rear side of the channel.

2. The pet toy of claim 1, further comprising a cover at least partly surrounding the controller and motor.

3. The pet toy of claim 1, wherein the proximity sensor is a passive infrared (PIR) sensor or a microwave sensor.

4. The pet toy of claim 1, wherein the pet sensor array further comprises a vibration sensor.

5. The pet toy of claim 1, wherein the pet sensor array further comprises a tension sensor configured to sense variations in the tension of the drive belt.

6. The pet toy of claim 1, further comprising a belt synchronizing sensor configured to detect a feature of the drive belt as it passes thereby.

7. The pet toy of claim 1, wherein a central portion of the channel is encircled by the drive belt.

8. The pet toy of claim 1, wherein the channel is a recessed channel that is bounded by channel sides extending forward and backward beyond the drive belt as it circulates within the channel about the drive shaft and the idler pulley.

9. The pet toy of claim 8, wherein the open front side of the channel is formed between the channel sides and is less than 1.5 cm wide, a paw of the pet being thereby prevented from entering into the recessed channel and accessing the drive belt.

10. A pet toy configured to amuse and/or otherwise benefit a pet, the pet toy comprising:
    a rail comprising an elongated channel having a proximal end and a distal end;
    an idler pulley proximate the distal end of the channel;
    a drive shaft proximate the proximal end of the channel;
    a motor coupled to and configured to rotate the drive shaft;
    a drive belt extending along the channel between and encircling the drive shaft and the idler pulley, the drive belt being configured to circulate about the drive shaft and the idler pulley when the motor causes the drive shaft to rotate;
    a controller configured to activate and deactivate the motor;
    a pet sensor array in data communication with the controller, the pet sensor array comprising a pet proximity sensor, the pet proximity sensor being configured to detect at least one of a presence and a movement of a pet that is proximate the pet toy; and
    an elongated extension extending outward from the drive belt;

circulation of the drive belt thereby causing the drive belt extension to be alternately flung out through an open front side of the channel and withdrawn behind a rear side of the channel;

wherein the drive belt and elongated extension are formed by joining a distal end of a strap to an attachment location on the strap that is intermediate between the distal end of the strap and a proximal end of the strap, the drive belt being thereby formed by a first portion of the strap extending from its distal end to the attachment location, and the elongated extension being a second portion of the strap extending from the attachment location to the proximal end of the strap; and wherein the controller is configured to vary an operational mode of the toy in response to data received by the controller from the pet sensor array, varying said operational mode comprising varying at least one of a non-zero rotational speed of the motor and varying a rotation intermittency of the motor.

11. The pet toy of claim 10, wherein the controller is configured to change the operational mode upon detecting that interaction between the pet and the toy has decreased.

12. The pet toy of claim 10, wherein the controller is configured to select the operational mode according to at least one of an age and a weight of the pet as specified by a user.

13. The pet toy of claim 10, wherein the controller is configured to select the operational mode according to a personality type of the pet as specified by a user.

14. The pet toy of claim 10, wherein the controller is configured to select the operational mode according to a personality type of the pet, said personality type being estimated by the controller according to a pattern of usage of the toy by the pet as determined from data received by the controller from the pet sensor array.

15. The pet toy of claim 10, further comprising a wireless connectivity module that enables communication between the controller and a remote user device.

16. The pet toy of claim 15, wherein the controller is configured to vary the operational mode according to instructions received from the remote user device.

17. The pet toy of claim 15, wherein the controller is configured to transmit usage data to the remote user device, said usage data being data regarding at least one of times and durations of interaction between the pet and the toy.

18. The pet toy of claim 17, wherein the usage data includes an estimated quantity of calories consumed by the cat during usage of the toy.

19. The pet toy of claim 10, wherein:

the channel is a recessed channel that is bounded by channel sides extending forward and backward beyond the drive belt as it circulates within the channel about the drive shaft and the idler pulley; and the open front side of the channel is formed between the channel sides and is less than 1.5 cm wide, a paw of the pet being thereby prevented from entering into the recessed channel and accessing the drive belt.

20. A pet toy configured to amuse and/or otherwise benefit a pet, the pet toy comprising:

a rail comprising an elongated channel having a proximal end and a distal end;

an idler pulley proximate the distal end of the channel;

a drive shaft proximate the proximal end of the channel;

a motor coupled to and configured to rotate the drive shaft;

a drive belt extending along the channel between and encircling the drive shaft and the idler pulley, the drive belt being configured to circulate about the drive shaft and the idler pulley when the motor causes the drive shaft to rotate, circulation of the drive belt thereby causing the drive belt extension to be alternately flung out through an open front side of the channel and withdrawn behind a rear side of the channel;

a controller configured to activate and deactivate the motor;

a pet sensor array in data communication with the controller, the pet sensor array comprising a pet proximity sensor, the pet proximity sensor being configured to detect at least one of a presence and a movement of a pet that is proximate the pet toy;

an elongated extension extending outward from the drive belt; and an identity tag sensor configured to sense a proximity of an identifying tag cooperative with the pet, and to sense an identity of the pet;

wherein the controller is configured to vary an operational mode of the toy in response to data received by the controller from the pet sensor array, varying said operational mode comprising varying at least one of a non-zero rotational speed of the motor and varying a rotation intermittency of the motor; and wherein the controller is configured to select the operational mode according to the sensed identity of the pet.

* * * * *